US011592291B2

(12) United States Patent
Sasaki

(10) Patent No.: US 11,592,291 B2
(45) Date of Patent: Feb. 28, 2023

(54) METHOD, DEVICE, AND PROGRAM FOR SURVEYING

(71) Applicant: TOPCON CORPORATION, Tokyo (JP)

(72) Inventor: You Sasaki, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 904 days.

(21) Appl. No.: 16/442,616

(22) Filed: Jun. 17, 2019

(65) Prior Publication Data

US 2020/0011664 A1 Jan. 9, 2020

(30) Foreign Application Priority Data

Jul. 6, 2018 (JP) .............................. JP2018-129143

(51) Int. Cl.
*G01C 1/02* (2006.01)
*G01C 3/08* (2006.01)
*G01C 15/06* (2006.01)

(52) U.S. Cl.
CPC ................. *G01C 1/02* (2013.01); *G01C 3/08* (2013.01); *G01C 15/06* (2013.01)

(58) Field of Classification Search
CPC . G01C 1/02; G01C 3/08; G01C 15/06; G01C 3/00
See application file for complete search history.

(56) References Cited

U.S. PATENT DOCUMENTS

| 5,076,690 | A | 12/1991 | Devos et al. |
| 8,767,190 | B2 | 7/2014 | Hall |
| 10,264,221 | B2 | 4/2019 | Kumagai et al. |
| 2003/0169414 | A1* | 9/2003 | Benz .................... G01C 15/002 356/141.5 |
| 2009/0235541 | A1 | 9/2009 | Kumagai et al. |

(Continued)

FOREIGN PATENT DOCUMENTS

| CN | 105823460 A | 8/2016 |
| JP | H09-105628 A | 4/1997 |

(Continued)

OTHER PUBLICATIONS

Extended European Search Report dated Nov. 29, 2019, in connection with European Patent Application Serial No. 19179635.8, 9 pgs.

(Continued)

*Primary Examiner* — Luke D Ratcliffe
(74) *Attorney, Agent, or Firm* — Chiesa, Shahinian & Giantomasi PC

(57) ABSTRACT

Detection of a target by a surveying device is automated to achieve simple work. A surveying method uses a surveying device for detecting and identifying a target device having an entire circumference reflection prism and a code display that is arranged in a vertical direction. The surveying device has a laser scanner configured to perform laser scanning along a vertical plane while horizontally rotating. The surveying method includes performing laser scanning by emitting laser scanning light along the vertical plane while making the surveying device horizontally rotate, and detecting the code display on the basis of the laser scanning light that is reflected back.

7 Claims, 8 Drawing Sheets

(56) References Cited

U.S. PATENT DOCUMENTS

| | | | |
|---|---|---|---|
| 2009/0241358 A1 | 10/2009 | Ohtomo et al. | |
| 2010/0256940 A1 | 10/2010 | Ogawa et al. | |
| 2012/0218546 A1 | 8/2012 | Ogawa et al. | |
| 2012/0242830 A1 | 9/2012 | Kumagai et al. | |
| 2013/0236107 A1 | 9/2013 | Fukaya et al. | |
| 2015/0293224 A1 | 10/2015 | Eldada et al. | |
| 2016/0187469 A1* | 6/2016 | Jeong | G01S 7/4817 356/5.01 |
| 2016/0216109 A1* | 7/2016 | Kumagai | H04N 7/181 |

FOREIGN PATENT DOCUMENTS

| | | |
|---|---|---|
| JP | 2008-268004 A | 11/2008 |
| JP | 2009-229192 A | 10/2009 |
| JP | 2010-151682 A | 7/2010 |
| JP | 2012-202821 A | 10/2012 |
| JP | 2013-186816 A | 9/2013 |
| JP | 2016-138802 A | 8/2016 |

OTHER PUBLICATIONS

Notice of Reasons for Refusal dated May 27, 2022, in connection with Japanese Patent Application No. 2018-129143, 6 pgs. (including translation).

First Office Action dated Jul. 27, 2022 in connection with Chinese Application No. 201910603202.8, 21 pgs. (including translation).

\* cited by examiner

METHOD, DEVICE, AND PROGRAM FOR SURVEYING

CROSS-REFERENCE TO RELATED APPLICATIONS

This application is based upon and claims benefit of priority from Japanese Patent Application No. 2018-129143, filed Jul. 6, 2018, the entire contents of which are incorporated herein by reference.

TECHNICAL FIELD

The present invention relates to automation of operation in surveying.

BACKGROUND

When a laser scanner is used in surveying, exterior orientation parameters, or a location position and attitude, of the laser scanner must be correctly determined. The operation for this determination involves measuring multiple targets or multiple reflection prisms, at which locations are preliminarily determined, by the laser scanner, and calculating the exterior orientation parameters of the laser scanner from the measured locations of the multiple targets or the multiple reflection prisms by a method of resection.

Japanese Unexamined Patent Application Laid-Open No. 2016-138802 discloses a technique for surveying using a total station (TS) and a reflection prism. In this technique, an identifiable code that can be identified from its image is disposed in proximity to the reflection prism, and the reflection prism is identified by image analysis.

According to the technique disclosed in Japanese Unexamined Patent Application Laid-Open No. 2016-138802, after an operator approximately sights the reflection prism, the reflection prism is automatically searched for by means of a searching function of the TS, and then, the identifiable code is recognized by using a camera.

Normally, in surveying using a reflection prism, many points are surveyed by repeating an operation as described above. Thus, an operator needs to perform the approximate sighting in the first step with respect to each of the many points and this requires time and labor. Some types of total stations (TS) have an automatic detection mode of a target or a reflection prism, using searching light, but the searching takes time. For this reason, in actual cases, an operator sights approximately first, and then, the automatic searching is performed in a narrowed search target area.

Methods for improving the speed of the automatic searching for a target are also investigated. However, as the speed of searching increases, detection failure and incorrect detection of the target also increase. Currently, desired performance still has not been achieved.

From another point of view, it is necessary to identify each of targets that are located at respective positions. For this purpose, a technique that uses an image for identification, as disclosed in Japanese Unexamined Patent Application Laid-Open No. 2016-138802, requires photographing the target to obtain an enlarged image after the target is sighted. Also, in this case, the operation for sighting is necessary.

SUMMARY

In view of these circumstances, an object of the present invention is to automate detection and identification of a target performed by a surveying device.

The present invention provides a surveying method using a surveying device for detecting and identifying a target device having an entire circumference reflection prism and a code display that is arranged in a vertical direction. The surveying device has a laser scanner configured to perform laser scanning along a vertical plane while rotating horizontally. The surveying method includes performing laser scanning by emitting laser scanning light along the vertical plane while making the surveying device horizontally rotate and also includes detecting the code display on the basis of the laser scanning light that is reflected back.

In the present invention, it is preferable that the entire circumference reflection prism and the code display be arranged on the same vertical line. In the present invention, it is preferable that the surveying method further include detecting the entire circumference reflection prism or the code display, or both, on the basis of intensity of the laser scanning light that is reflected back. It is also preferable that the surveying method include, after performing the detection of the entire circumference reflection prism or the code display, or both, performing laser scanning again with respect to the code display in the condition in which a scanning density is changed to be higher than a previous scanning density.

In the present invention, it is preferable that the laser scanning along the vertical plane be performed in a direction from the code display side to the entire circumference reflection prism. In the present invention, it is preferable that, in a case in which a light-receiving element for receiving the laser scanning light that is reflected back is saturated, point cloud data that is obtained before the saturation occurs be obtained as point cloud data of the code display.

The present invention also provides a surveying device including a laser scanner configured to perform laser scanning by emitting laser scanning light along a vertical plane while rotating horizontally. The surveying device is configured to detect and identify a target device having an entire circumference reflection prism and a code display that is arranged in a vertical direction. The surveying device includes a code display detecting unit configured to detect the code display on the basis of the laser scanning light that is reflected back.

The present invention further provides a non-transitory computer recording medium storing computer executable instructions for controlling operation of a surveying device. The surveying device has a laser scanner configured to perform laser scanning along a vertical plane while horizontally rotating. The surveying device is configured to detect and identify a target device having an entire circumference reflection prism and a code display that is arranged in a vertical direction. The computer executable instructions are made to, when executed by a computer processor, cause the computer processor to perform laser scanning by making the surveying device emit laser scanning light along the vertical plane while rotating horizontally and to detect the code display on the basis of the laser scanning light that is reflected back.

The present invention enables automating detection and identification of a target performed by a surveying device.

DETAILED DESCRIPTION

1. First Embodiment

Target Device

Figure 1:
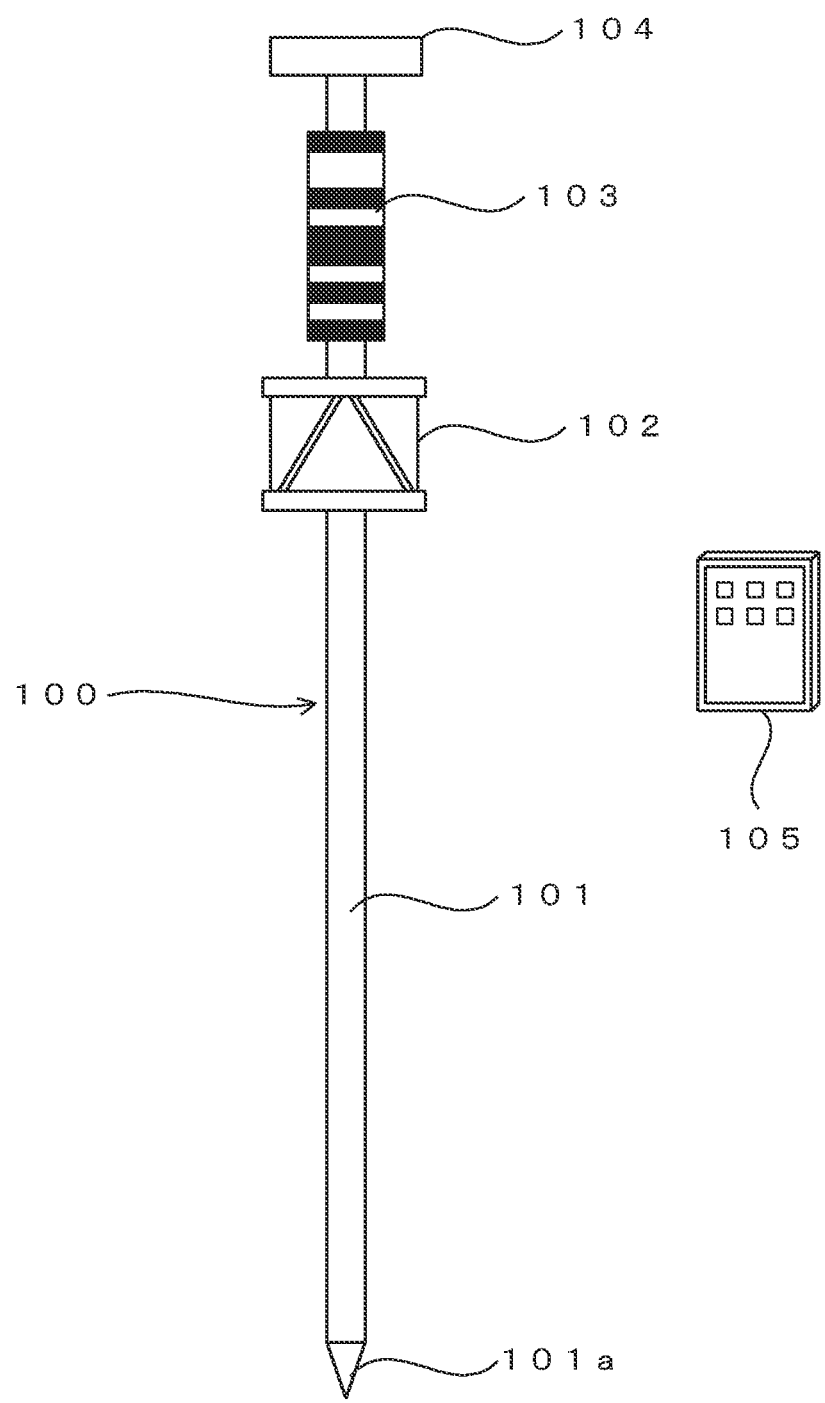
FIG. 1 is a conceptual diagram of a target device of an embodiment.

FIG. 1 shows a target device 100. The target device 100 is used in operation for obtaining exterior orientation parameters of a surveying device 400. The surveying device 400 is a total station equipped with a laser scanner. Details of the surveying device 400 are described later. The target device 100 includes a rod-shaped support member 101. The support member 101 has an entire circumference reflection prism 102, an entire circumference bar code display part 103, and a GNSS unit 104 that are fixed thereto. The entire circumference bar code display part 103 constitutes an identification display.

The target device 100 is used in a condition in which a bottom end 101a of the support member 101 is brought into contact with a ground surface so that the target device 100 will stand along a vertical direction. The target device 100 also includes an electronic level (not shown), which helps in standing the target device 100 vertically. The following describes each component of the target device 100 in a condition of standing in the vertical direction.

The support member 101 extends in the vertical direction. The entire circumference reflection prism 102 reflects incident light from the entire circumference in the range of 360 degrees of a horizontal direction, by 180 degrees. The entire circumference reflection prism 102 can be embodied by a commercially available product.

The entire circumference bar code display part 103 has a cylindrical shape. The surface of the cylindrical shape has a one-dimensional bar code display that enables identification and determination of the target device 100. The one-dimensional bar code display includes a code along an extending direction of the support member 101, which is the vertical direction. The bar code display is made up of a combination of a circular optical reflection part and a circular light absorption part. In this example, the bar code display is made up of a combination of circular stripe patterns in white and black that are arranged along the vertical direction. The optical reflection part may use a light reflecting member made of a metal, such as aluminum.

The entire circumference bar code display part 103 having the cylindrical shape can be read from a direction by 360 degrees of the horizontal direction. The entire circumference bar code display part 103 may have a polygonal column structure, such as a quadrangular column or a hexagonal column. The bar code may be a two-dimensional bar code or a character code.

The GNSS unit 104 includes an antenna, an electronic circuit, a position calculator, and a signal output circuit. The antenna receives a navigation signal from a navigation satellite of a GNSS. The electronic circuit receives the navigation signal received by the antenna. The position calculator calculates location information on the basis of the navigation signal. The signal output circuit outputs a signal of the calculated location information. These components are the same as those in an ordinary GNSS unit, which is generally called a GPS receiver. In this example, the GNSS unit 104 performs highly accurate positioning using relative positioning such as an RTK method.

In this example, the GNSS unit 104 measures a location of the entire circumference reflection prism 102. This processing is performed as follows. As preparation, a positional relationship between the antenna of the GNSS unit 104 and a center of reflection of the entire circumference reflection prism 102 is preliminarily determined. The GNSS unit 104 corrects positioning data obtained from the GNSS on the basis of the positional relationship and output from the electronic level (not shown), and then, the GNSS unit 104 calculates the location or the position of the center of reflection, of the entire circumference reflection prism 102.

The output from the GNSS unit 104 and the output from the electronic level (not shown) are transmitted to a terminal 105. This communication is performed via a wired network or a wireless network such as a wireless LAN. The terminal 105 is a portable computer and uses, for example, a tablet or a smartphone. A dedicated hardware may be prepared for the terminal 105.

In this example, the location of the target device 100 is represented by the location of the entire circumference reflection prism 102. On the basis of this, the following describes the location of the entire circumference reflection prism 102 as the location of the target device 100.

The terminal 105 is communicable with the surveying device 400, which is described later. The terminal 105 includes a display, such as a liquid crystal display. This display shows various kinds of information transmitted from the surveying device 400 and map information. For example, the display shows an electronic map. The electronic map shows information such as the location of the target device 100 measured by the GNSS unit 104, a tilt of the target device 100 measured by the electronic level (not shown), a guide to the located position of the target device 100, and various kinds of instruction information for an operator using the target device 100.

Use of Target Device

Figure 2:
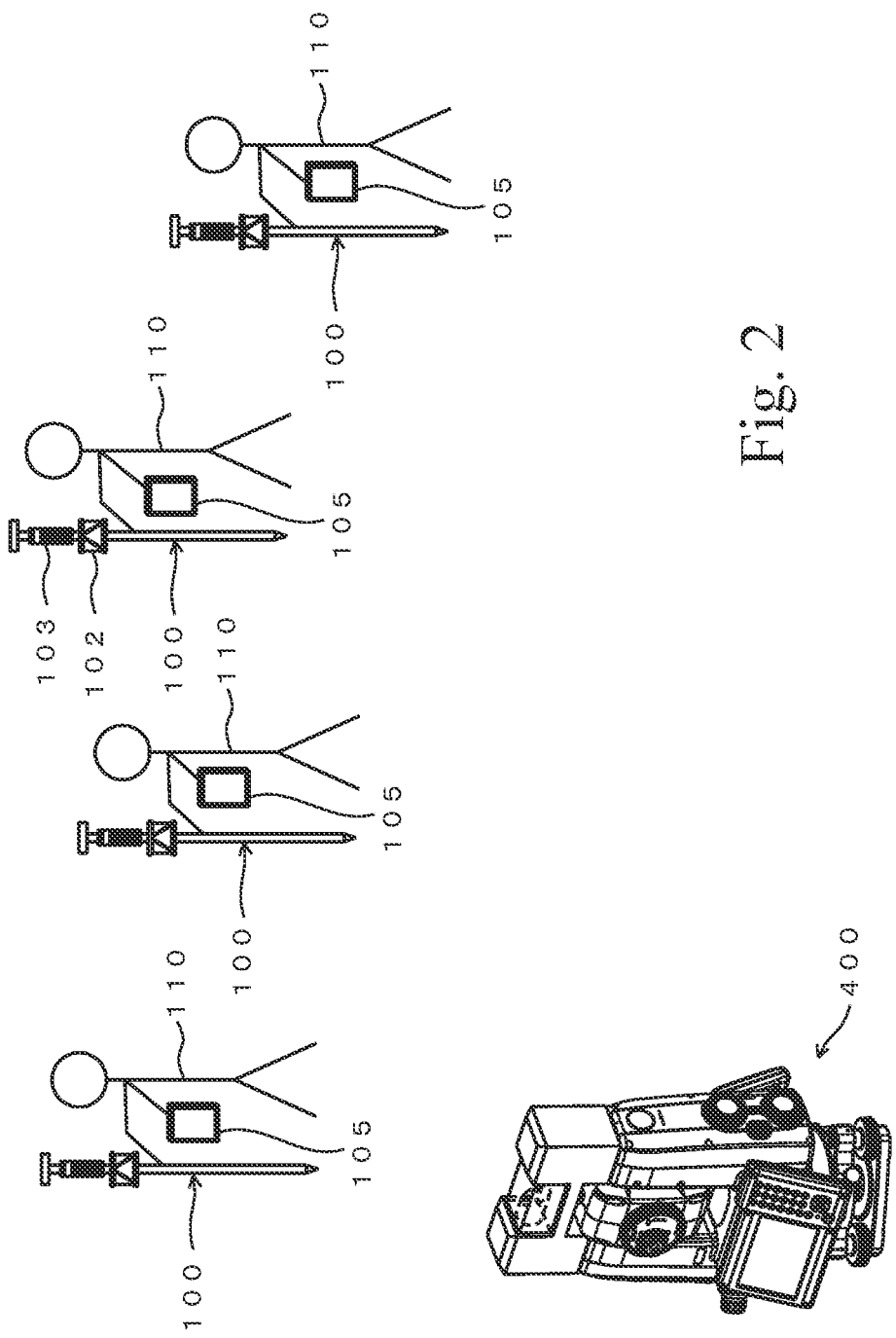
FIG. 2 shows an example of a situation of performing operation for obtaining exterior orientation parameters of a surveying device.

FIG. 2 shows an example of a case of performing operation for obtaining exterior orientation parameters, or location and attitude, of the surveying device 400 by using the target device 100. FIG. 2 shows the surveying device 400 and multiple target devices 100 located around the surveying device 400. In this case, four target devices 100 are located.

FIG. 2 shows an example of a situation in which an operator 110 carries the target device 100 while holding it in the hand and locates the target device 100 at a planned point while supporting it, and then the target device 100 is positioned. The surveying device 400 may be configured to stand by itself, and the surveying device 400 may be made to stand by itself at the located point. Although the located point of the target device 100 is determined in advance in this embodiment, the located point may be determined at site.

FIG. 2 shows four target devices 100 as an example. The four target devices 100 may be set at the same time and may be positioned by the surveying device 400. Alternatively, one target device 100 may be used at four positions, and the four positions may be positioned successively. Instead of this, two target devices 100 may be used at two respective positions, and a total of four positions may be set. To obtain the exterior orientation parameters of the surveying device 400, at least three positioning points are required. Normally, at least three points, or many points as much as possible, are used as the positioning points or control points to calculate the exterior orientation parameters of the surveying device 400.

Surveying Device

Figure 3:
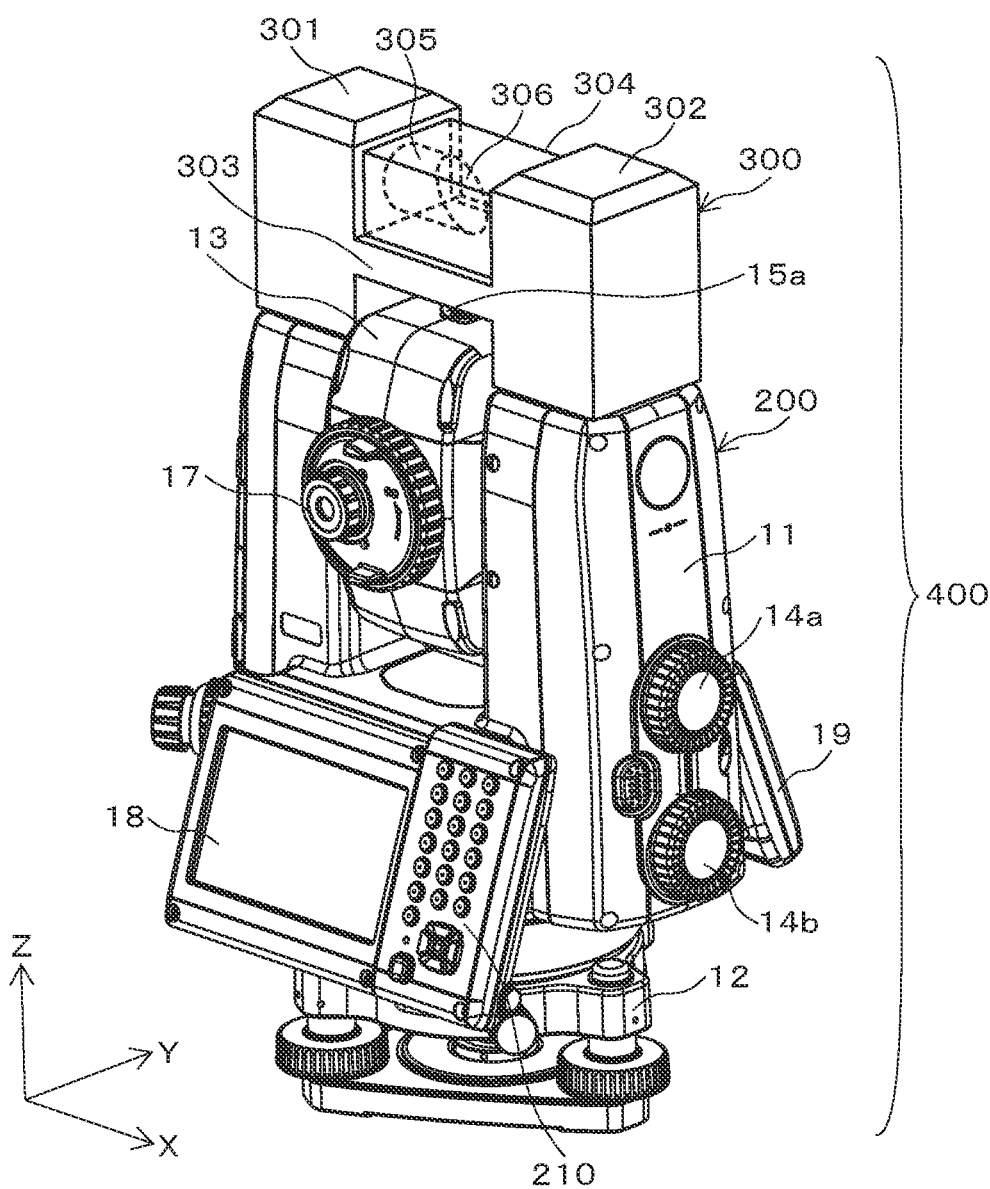
FIG. 3 is a perspective view of the surveying device.
Figure 4:
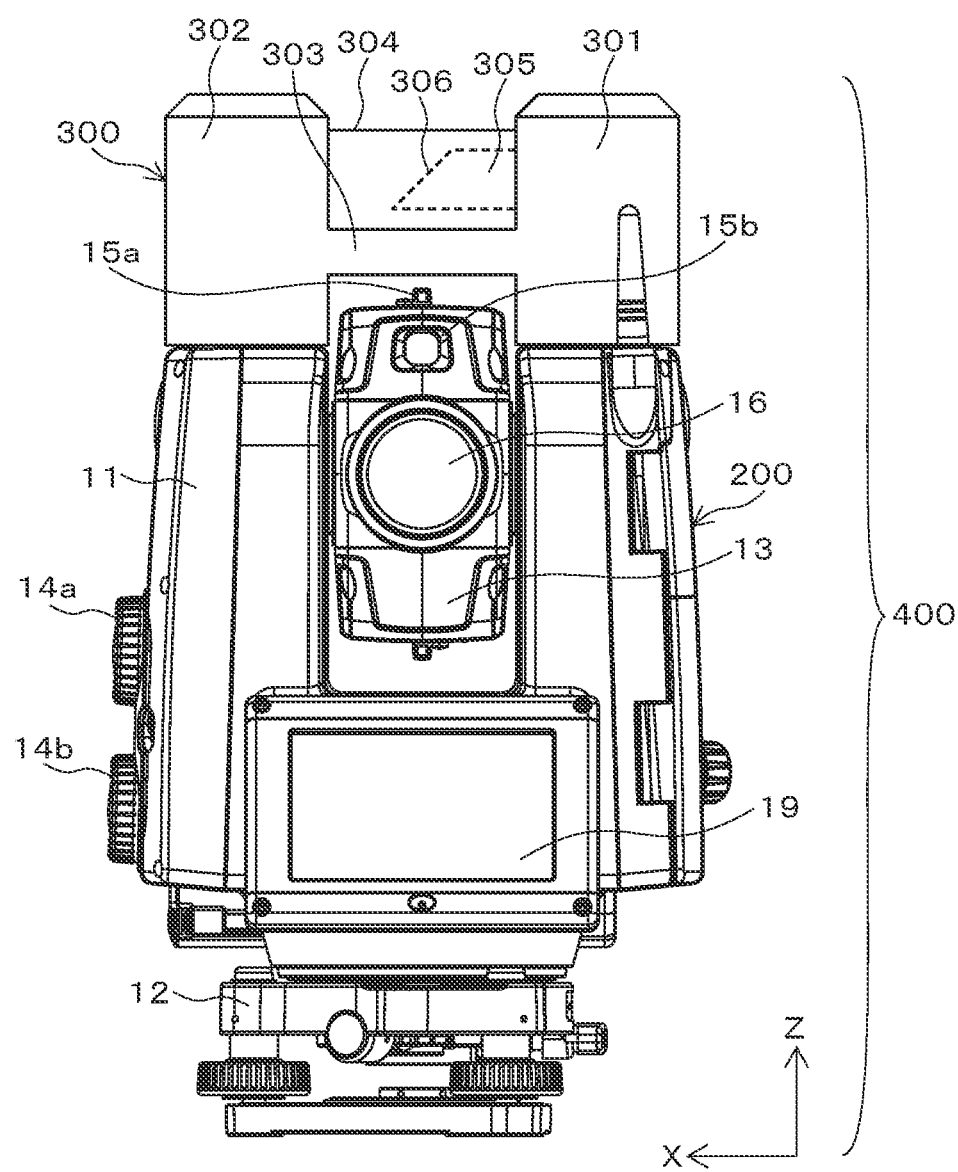
FIG. 4 is a front view of the surveying device.

The following describes the surveying device 400 shown in FIG. 2. FIG. 3 shows a perspective view of the surveying device 400. FIG. 4 shows a front view of the surveying device 400. The surveying device 400 has a TS functional part 200 and a laser scanner part 300 that are combined. The TS functional part 200 functions as a total station. The laser scanner part 300 functions as a laser scanner.

The TS functional part 200 exhibits a function as a total station (TS). Details of the TS are disclosed in Japanese Unexamined Patent Applications Laid-Open Nos. 2009-229192 and 2012-202821, for example.

The laser scanner part 300 performs laser scanning to obtain three-dimensional point cloud data, which is hereinafter called "point cloud data". The technique relating to the laser scanner is disclosed in Japanese Unexamined Patent Applications Laid-Open Nos. 2010-151682 and 2008-268004 and in U.S. Pat. No. 8,767,190, for example. In addition, a laser scanner that scans electronically can also be used. Such a laser scanner is disclosed in U.S. Patent Application Publication No. 2015/0293224, for example.

The laser scanner part 300 performs laser scanning in a direction of an angle of elevation or depression along a vertical plane containing an optical axis of distance measuring light of the TS functional part 200. In this embodiment, the vertical plane is a Y-Z plane shown in FIG. 3. The laser scanning is performed along the vertical plane while a horizontally rotating unit 11 is rotated horizontally, whereby laser scanning is performed at the circumference by 360 degrees including the above direction. Of course, it is possible to perform laser scanning on a specific narrow area.

The point cloud data that is obtained by the laser scanner part 300 has a local coordinate system having an origin at the surveying device 400. The position of the origin of the local coordinate system is preliminarily selected due to it being constant regardless of rotation of the horizontally rotating unit 11 and a vertically rotating unit 13. Point cloud data in an absolute coordinate system is obtained on the condition that the exterior orientation parameters, or location and attitude, in the absolute coordinate system, of the surveying device 400 are determined. The absolute coordinate system is, for example, a coordinate system used in a GNSS. The absolute coordinate system describes a location in terms of longitude, latitude, and altitude above mean sea level.

The surveying device 400 includes the horizontally rotating unit 11. The horizontally rotating unit 11 is held on a base 12 in a horizontally rotatable state. The base 12 is fixed on a top of a tripod (not shown). The horizontally rotating unit 11 has an approximately U shape and has two extending parts that upwardly extend, and the vertically rotating unit 13 is held between the two extending parts so as to be controllable in angle of elevation, which includes elevation angle and depression angle.

The horizontally rotating unit 11 rotates horizontally relative to the base 12 by electrical operation. The vertically rotating unit 13 rotates in the vertical plane by electrical operation. The horizontally rotating unit 11 has a horizontal rotation angle controlling dial 14*a* and an elevation and depression angle controlling dial 14*b* that are arranged thereon. The horizontal rotation angle controlling dial 14*a* is operated to adjust a horizontal rotation angle of the horizontally rotating unit 11. The elevation and depression angle controlling dial 14*b* is operated to adjust the angle of elevation, which includes the elevation angle and the depression angle, in the vertical plane, of the vertically rotating unit 13.

The vertically rotating unit 13 has a sighting unit 15*a* for approximate sighting, arranged on a top thereof. The vertically rotating unit 13 also has an optical sighting unit 15*b* with a visual field narrower than that of the sighting unit 15*a* and has a telescope 16 that can be collimated at a higher accuracy.

The vertically rotating unit 13 contains an optical system that conducts an image captured by the sighting unit 15*b* and the telescope 16, to an eyepiece 17. The image that is captured by the sighting unit 15*b* and the telescope 16 is visually recognized by looking into the eyepiece 17. The vertically rotating unit 13 houses a camera and an optical system that guides an image captured by the telescope 16, to the camera. The image that is captured by the telescope 16 can be imaged by the camera.

The telescope 16 also serves as an optical system for distance measuring laser light and for tracking light. The tracking light is used to track and capture an object to which a distance is to be measured. In this case, the object is the entire circumference reflection prism 102. The optical system is designed so that optical axes of the distance measuring light and the tracking light will coincide with an optical axis of the telescope 16. The structure of this part is the same as that of a commercially available TS.

The horizontally rotating unit 11 has displays 18 and 19 mounted thereto. The display 18 is integrated with a controller 210. The controller 210 has a numeric keypad, a cross operation button, and other operation parts arranged thereon, which are used to perform various operations relating to the surveying device 400 and are used to input data. The displays 18 and 19 display various information necessary to operate the surveying device 400, display surveying data, and display other information. These two displays are mounted in order to enable viewing the display from either a front side or a back side without having to rotate the horizontally rotating unit 11.

The horizontally rotating unit 11 has the laser scanner part 300 that is fixed on a top. The laser scanner part 300 has a first column 301 and a second column 302. The first column 301 and the second column 302 are connected by a connecting part 303. The space over the connecting part 303 between the first column 301 and the second column 302 is covered with a protective case 304. The protective case 304 is made of a member that transmits scanning laser light. The protective case 304 houses a columnar rotating part 305 that protrudes from the first column 301 in a horizontal direction. A tip of the rotating part 305 is obliquely cut off, and this tip has a tilt mirror 306 fixed thereon.

The rotating part 305 is driven to be rotated around an extending direction thereof, which is the horizontal direction, by a motor contained in the first column 301. The first column 301 contains, in addition to the motor, a driving circuit for driving the motor, a control circuit for the driving circuit, a sensor for measuring a rotation angle of the rotating part 305, and a peripheral circuit of the sensor.

Figure 5:
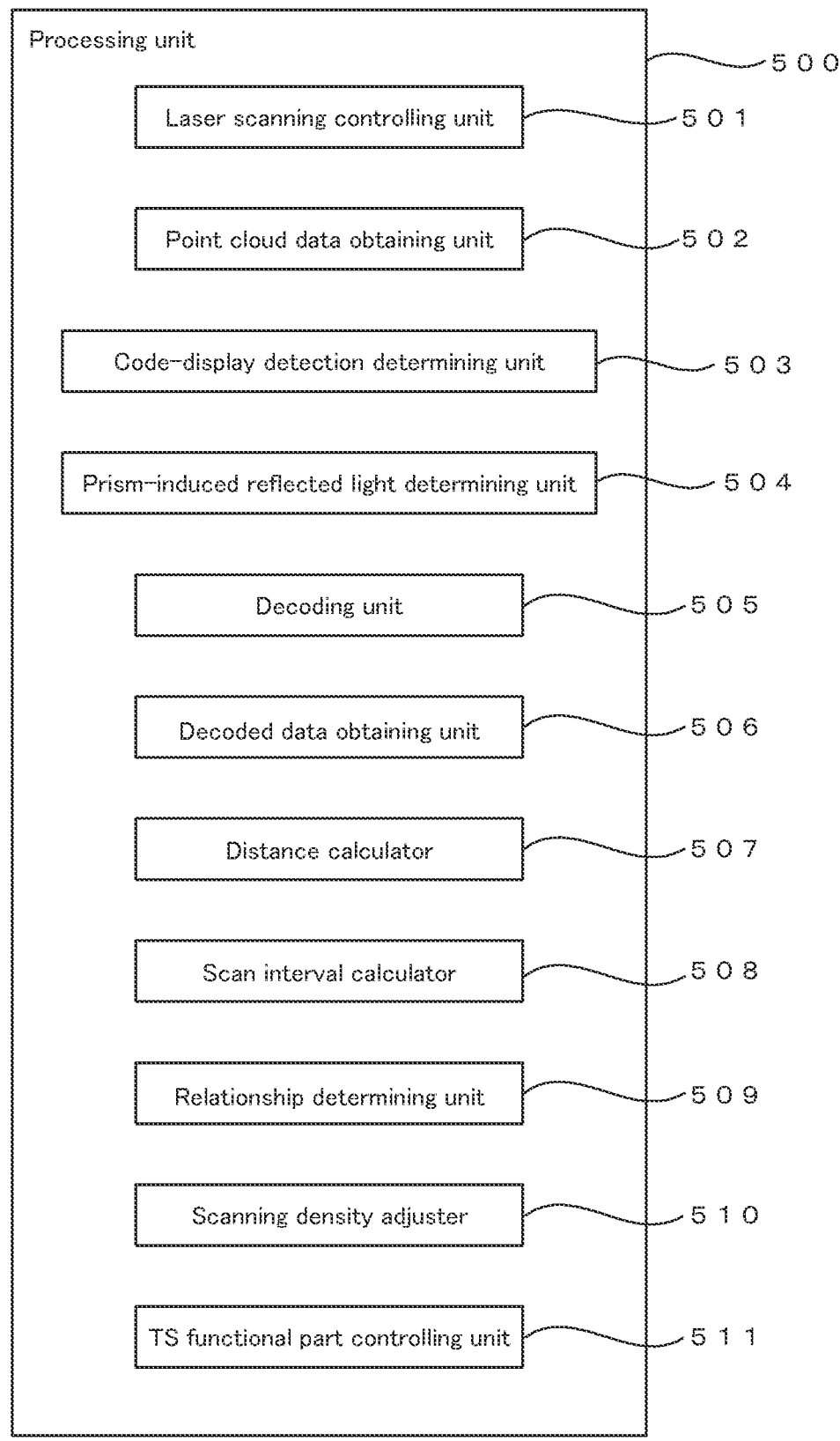
FIG. 5 is a block diagram of a processing unit of the surveying device.

The second column 302 contains a light emitting part for emitting laser scanning light, a light receiving part that receives the laser scanning light reflected back from an object, an optical system for the light emitting part and the light receiving part, and a distance calculator that calculates a distance to a laser scanned point. A three-dimensional location of the laser scanned point is calculated on the basis of a rotation angle of the rotating part 305, a horizontal rotation angle of the horizontally rotating unit 11, and a distance to the laser scanned point. The three-dimensional location of the laser scanned point is calculated by the laser scanner part 300 or a laser scanning controlling unit 501 that is disposed in the horizontally rotating unit 11. The laser scanning controlling unit 501 is shown in FIG. 5.

The laser scanning light is composed of one beam. The laser scanning light is emitted from the inside of the second column 302 to the tilt mirror 306 and is reflected thereat to exit to the outside via the transparent protective case 304. The laser scanning light is emitted from the light emitting part by means of pulse emission at a repetition frequency of several kHz to several hundreds of kHz. The emitted pulsed light advances in the horizontal direction to the tilt mirror 306 at the tip of the rotating part 305 that is rotating, and this light is reflected thereat at a right angle. Due to rotation around the horizontal axis of the rotating part 305, the laser scanning light is radially and sporadically emitted by means of pulse irradiation, to scan along a vertical plane containing the optical axis of the telescope 16 in the direction of the angle of elevation or depression.

The laser scanning is performed in the vertical plane containing an optical axis of the TS functional part 200, and more exactly, the optical axis of the telescope 16. For example, in the case shown in FIG. 1, assuming that the optical axis of the TS functional part 200 is on a Y-axis, laser scanning light from the laser scanner part 300 exists in a Y-Z plane at a position of X=0 and is emitted along the Y-Z plane.

The laser scanning is performed while the horizontally rotating unit 11 is horizontally rotated, whereby three-dimensional laser scanning is performed on a necessary area.

The scanning light that is reflected back from an object reverses the path of the emitted light and is received by the light receiving part in the second column 302. The laser scanned point, that is, the point that reflects the scanning light, is positioned by referring to light emission timing and light reception timing of the scanning light as well as the angle of the rotating part 305 and the horizontal rotation angle of the horizontally rotating unit 11 at each of these timings. The angle of the rotating part 305 is elevation or depression. The principle of the positioning is the same as that for normal laser distance measurement.

The positioning is performed to each of many scanned points, whereby three-dimensional coordinates of each of the scanned points are obtained. The obtained three-dimensional coordinates of each of the scanned points form point cloud data.

The density of the scanned points to be scanned, that is, the scanning density, is adjusted by varying an oscillation frequency or a pulse interval of the scanning laser light, a rotation speed of the horizontally rotating unit 11, or a rotation speed of the rotating part 305.

Processing Unit

The surveying device 400 includes the processing unit 500 shown in FIG. 5. The processing unit 500 performs various kinds of processing relating to the surveying device 400. The processing unit 500 functions as a computer and is constituted of a microcomputer and various kinds of electronic circuits.

The processing unit 500 includes the laser scanning controlling unit 501, a point cloud data obtaining unit 502, a code-display detection determining unit 503, a prism-induced reflected light determining unit 504, a decoding unit 505, a decoded data obtaining unit 506, a distance calculator 507, a scan interval calculator 508, a relationship determining unit 509, a scanning density adjuster 510, and a TS function controlling unit 511. The distance calculator 507 calculates a distance "L" to the code display on the basis of point cloud data. The scan interval calculator 508 calculates a scan interval "D" in scanning the code display on the basis of the distance "L" to the code display. The relationship determining unit 509 determines a relationship between a minimum distance "d" of display patterns of the code display and the scan interval "D".

The laser scanning controlling unit 501 performs controlling and processing that relate to obtaining of the point cloud data by the laser scanner part 300. In this example, data of three-dimensional coordinates of each of points that reflect the scanning laser light and data of intensity of reflected light are obtained as point cloud data. The point cloud data obtaining unit 502 receives the point cloud data obtained by the laser scanner part 300.

The code-display detection determining unit 503 determines a condition of detecting bar code information of the entire circumference bar code display part 103 on the basis of the data of intensity of the reflected light, which is included in the point cloud data. For example, it is determined that 30% of the bar code information is successfully decoded, 50% of the bar code information is successfully decoded, or 100% of the bar code information is successfully decoded.

The prism-induced reflected light determining unit 504 determines whether the point cloud data includes data based on the reflected light that is reflected back from the entire circumference reflection prism 102. The entire circumference reflection prism 102 is formed by using a mirror surface and reflects the laser scanning light at a high reflection efficiency. Thus, the intensity of the reflected light that is reflected back from the entire circumference reflection prism 102 is highest. This phenomenon is used to detect the reflected light that is reflected back from the entire circumference reflection prism 102.

In one example, the intensity of the detected light is determined by using a threshold. In this case, light with an intensity exceeding a specific threshold is detected as the reflected light that is reflected back from the entire circumference reflection prism 102. In another example, a saturated condition of a light-receiving element of the laser scanner is detected to recognize detection of the reflected light that is reflected back from the entire circumference reflection prism 102.

In general, in a case of using a photodiode or a phototransistor as the light-receiving element of the laser scanner, the light-receiving element fails to accept properly upon receiving light with an intensity exceeding input resistance and is saturated, whereby correct characteristics are not obtained. Once this phenomenon occurs, during a period of approximately several microseconds to approximately several tens of microseconds, the output is continuously saturated, for example, an abnormal value is continuously output, and correct light detection is difficult to perform. Detecting this phenomenon enables determination of reception of the reflected light that is reflected back from the entire circumference reflection prism 102.

In the case of using this saturation phenomenon of the light-receiving element, a combination of a light emission intensity of the laser scanning light, the kind of the entire circumference reflection prism 102 to be used, an element of the light receiving unit, setting of the optical system, and other parameters, is preliminarily adjusted. Thus, a condition that causes the light-receiving element to be saturated by the reflected light that is reflected back from the entire circumference reflection prism 102 and that causes the light-receiving element to be not saturated by other reflected light, is investigated in advance.

The decoding unit 505 decodes the bar code information of the entire circumference bar code display part 103 on the basis of information of a reflection intensity, which is included in the point cloud data. Then, the decoding unit 505 reads identification information of the entire circumference bar code display part 103 or identification information of the target device 100 from the decoded bar code information. The bar code is decoded by reading intensity variation of the reflected light of the scanning light. This is the same as that in the case of decoding an ordinary bar code.

The decoded data obtaining unit 506 obtains the code information of the entire circumference bar code display part 103, which is decoded by the decoding unit 505, that is, the identification information of the target device 100. The distance calculator 507 calculates a distance "L" from the surveying device 400 to a reflection surface of the entire circumference bar code display part 103 on the basis of the reflected light that is reflected back from the entire circumference bar code display part 103. The following describes an example of this processing. First, data of a point that is used in determination by the code-display detection determining unit 503 or a point that is considered as being based on the reflected light that is reflected back from the entire circumference bar code display part 103 is extracted. Next, three-dimensional information of the data of the extracted point is used to calculate the distance "L" from the surveying device 400 and this point.

The scan interval calculator 508 calculates a scan interval "D", which is a distance between adjacent scanned points, at an area containing the point that is used to calculate the distance "L". This calculation is performed as follows. First, an open angle θ between adjacent optical axes of the scanning pulsed light in the vertical direction or an up-down direction at the time of obtaining the point is obtained from the scanning condition.

Assuming that the scan interval "D" is approximated by a circular arc, a radius "L" and a circular arc "D" having a central angle θ are represented as D=θ×L. The radius "L" is calculated as the distance "L" by the distance calculator 507, and the central angle θ is obtained from the scanning condition. Thus, the scan interval "D" is calculated by using the relational expression described above.

For example, a light emission frequency of the scanning laser light is 50 kHz, the number of rotations of the rotating part 305 is 5 times per second, and the distance "L" is 50 meters. In this case, the number of pulses per one rotation is 10000, and θ=2θ/10000. Thus, D=(2θ/10000)×50≈3 cm.

The relationship determining unit 509 determines whether the minimum interval "d" of the display patterns of the code display and the scan interval "D" have a relationship that allows an appropriate reading of the bar code display of the entire circumference bar code display part 103.

For example, in a case in which the minimum value "d" among values of the widths and the intervals of the bars of the bar code display and the scan interval "D" have a relationship d<D, there may be a bar or an interval of the bars, from which a scanned point is not obtained. In such a case, a relationship d>D is set to reliably make the bar or the interval of the bars irradiated with the scanning light, thereby enabling obtaining reflected light that is reflected back from every part of the bar code display of the entire circumference bar code display part 103.

The scanning density adjuster 510 adjusts the conditions of the laser scanning so that the relationship d>D will be obtained. The TS functional part controlling unit 511 controls movement of the TS functional part 200 of the surveying device 400. This movement control is the same as that for a commercially available TS.

Example of Processing

The following describes an example of work for obtaining the exterior orientation parameters in the absolute coordinate system of the surveying device 400 in the situation shown in FIG. 2. Of course, processing for obtaining exterior orientation parameters in an appropriate local coordinate system is also possible.

The exterior orientation parameters of the surveying device 400 are obtained in order to obtain point cloud data by means of laser scanning using the laser scanning function of the surveying device 400. Obtaining the exterior orientation parameters of the surveying device 400 in the absolute coordinate system enables obtaining three-dimensional point cloud data in the absolute coordinate system by means of the laser scanning.

In general, laser scanning is performed from multiple points of view in order to eliminate blind spots or occlusions. At this time, in the condition in which exterior orientation parameters of the located position of the surveying device 400 viewed from each point are obtained in the absolute coordinate system, three-dimensional point cloud data that are obtained at the respective points of view are easy to consolidate in the same coordinate system or in the absolute coordinate system.

A process for mutually matching three-dimensional point cloud data that are obtained at different points of view is a large burden on processing, and margin of error in data and calculation error should be taken into consideration. In view of this, three-dimensional point cloud data in the same coordinate system enables avoiding these problems even though the three-dimensional point cloud data are obtained from different points of view. This technique requires obtaining exterior orientation parameters of a laser scanner in the absolute coordinate system with respect to each of multiple points of view. In the case of this embodiment, it is necessary to obtain exterior orientation parameters of the surveying device 400. The exterior orientation parameters are obtained in accordance with the processing shown in FIG. 6.

In this embodiment, the exterior orientation parameters of the surveying device 400 are obtained by using the target device 100. This processing is performed as follows. (1) First, the surveying device 400 is located. At this stage, the location and the attitude of the surveying device 400 are unknown. (2) The target device 100 is located. (3) The location of the target device 100 is obtained by relative positioning using a GNSS. (4) The target device 100 is positioned by using the TS function of the surveying device 400.

While the location of the target device 100 is changed, these work steps are repeated to obtain multiple control points or orienting points, in which locations are determined, around the surveying device 400. Thereafter, the location and the attitude, that is, the exterior orientation parameters, of the surveying device 400 in the absolute coordinate system are determined by a method of resection. The method of resection is disclosed in, for example, Japanese Unexamined Patent Application Laid-Open No. 2013-186816. After the exterior orientation parameters in the absolute coordinate system of the surveying device 400 are obtained, the surveying device 400 may be used for each kind of surveying using laser scanning and the functions of the TS.

In the work relating to obtaining the exterior orientation parameters of the surveying device 400, it is necessary for the surveying device 400 to capture and lock on the target device 100. In this embodiment, the laser scanning function of the laser scanner part 300 for obtaining point cloud data is used to capture the target device 100 and read the code information. The following describes an example of this processing.

Figure 6:
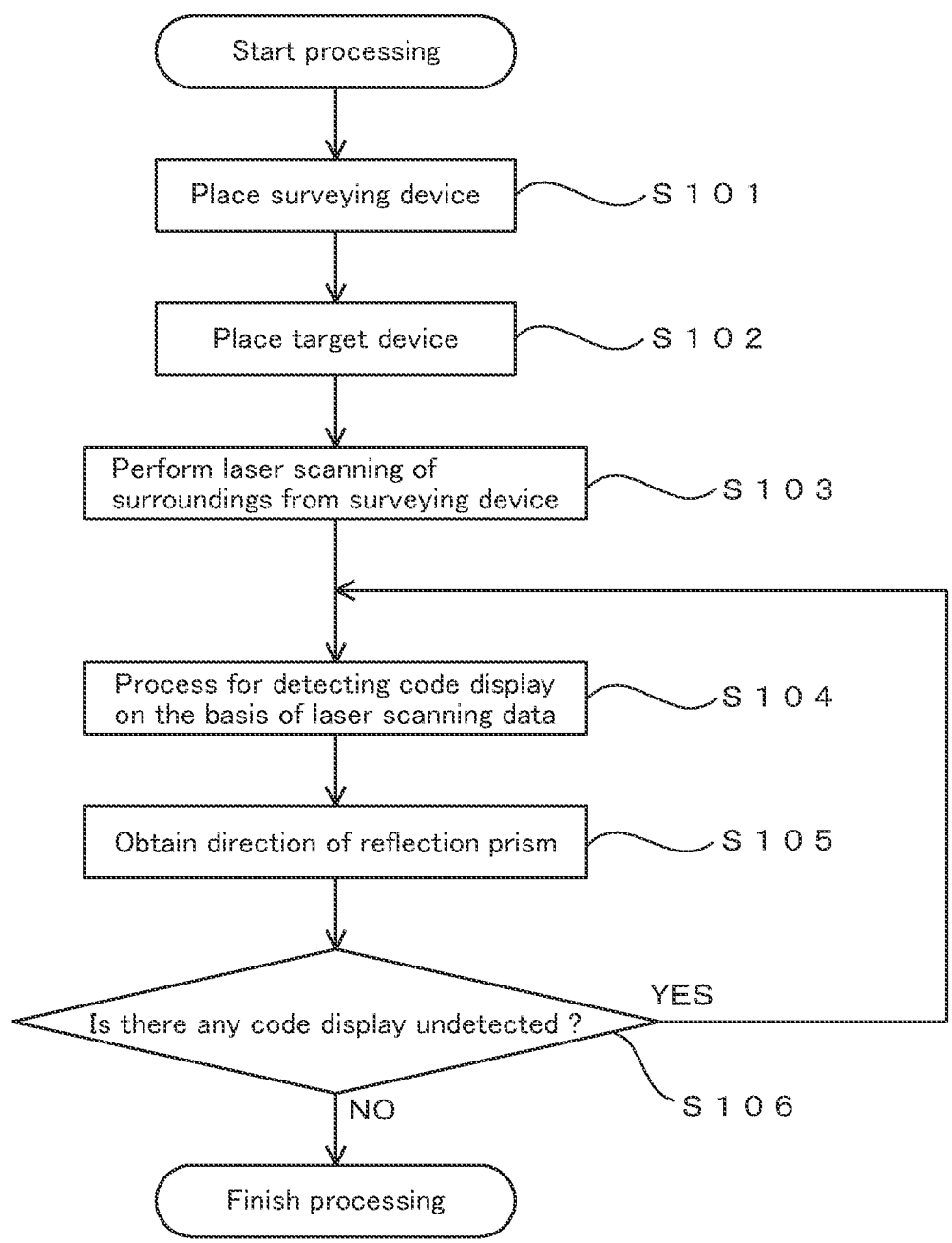
FIG. 6 is a flowchart showing an example of a processing procedure.
Figure 7:
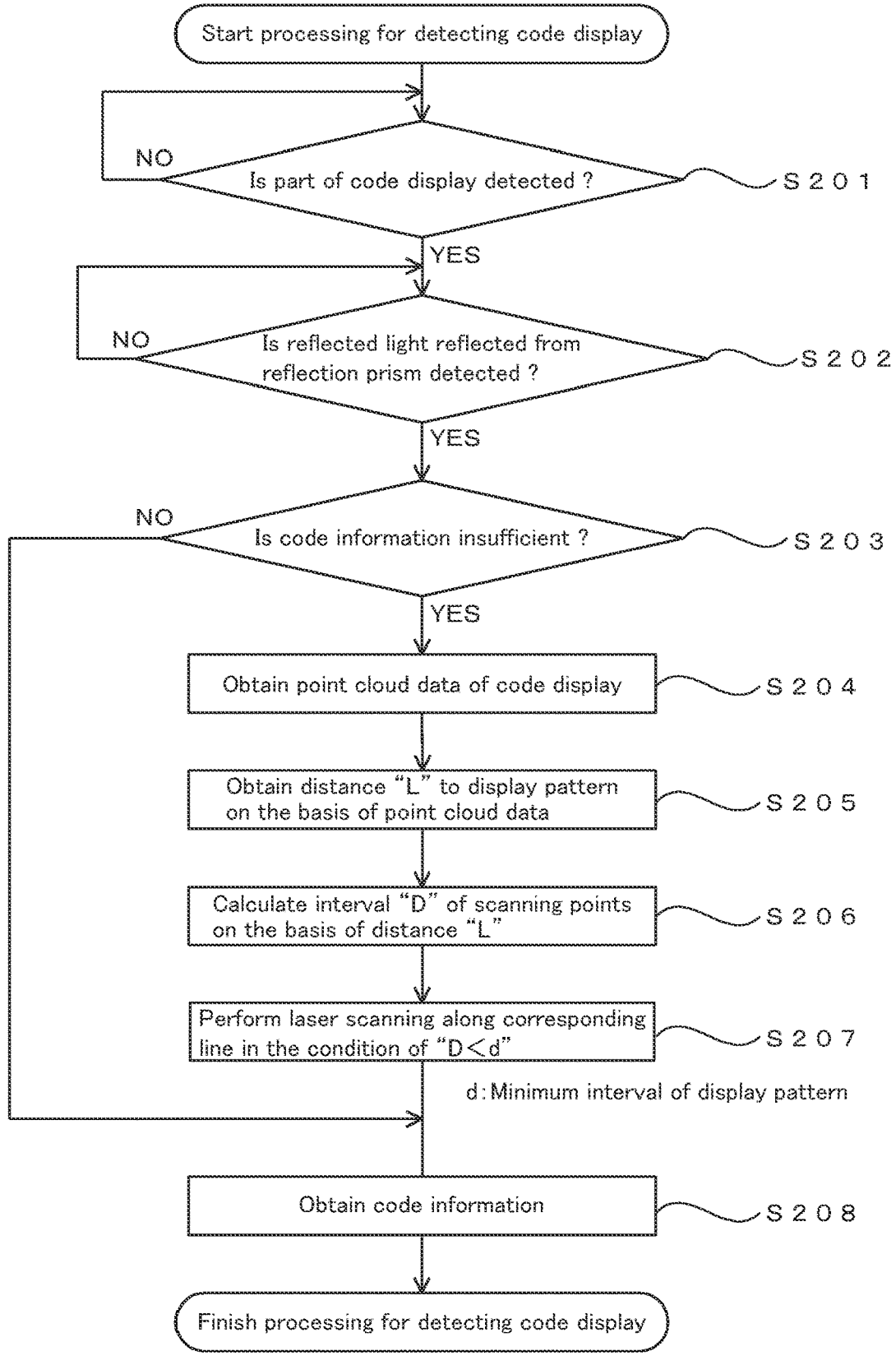
FIG. 7 is a flowchart showing an example of a processing procedure.

FIG. 6 is a flowchart showing a processing procedure for capturing the target device 100. FIG. 7 is a flowchart showing details of step S104 in FIG. 6. Programs for executing the processing in FIGS. 6 and 7 are stored in an appropriate storage area and are executed by the processing unit 500 shown in FIG. 5. It is also possible to store these programs in an external storage medium.

First, the surveying device 400 is located at a position appropriate for laser scanning (step S101). The located position is roughly determined in advance or may be determined at the site. Next, the target device 100 is located at each of multiple positions that can be viewed from the surveying device 400 (step S102).

An example of this situation is shown in FIG. 2. In this example, the operator 110 carries the target device 100 by hand and locates the target device 100 at a predetermined position that serves as a control point. At this time, the position at which the target device 100 is located is determined in advance, and this position is displayed on the terminal 105 held by the operator 110 to guide the operator 110.

It is preferable to locate multiple target devices 100 so as to surround the surveying device 400 in order to obtain the exterior orientation parameters of the surveying device 400 at higher accuracy.

After the target device 100 is located, laser scanning is performed to the surroundings of the surveying device 400 by using the laser scanning function of the surveying device 400 (step S103). This process is performed by the laser scanning controlling unit 501. It is possible to perform this laser scanning while limiting the area to be scanned. The area to be scanned is set so that all of the multiple target devices 100 located around the surveying device 400 will be scanned.

As a result of the execution of step S103, point cloud data or laser scanning data of the surroundings of the surveying device 400 is obtained. This point cloud data is received by the point cloud data obtaining unit 502. The direction of the laser scanning is set to cause the scanning to be performed from above to below. The reason for this is to make the scanning light first hit the entire circumference bar code display part 103 and then hit the entire circumference reflection prism 102.

The following describes the reason for performing the laser scanning from above to below. In this embodiment, the reflectance of the entire circumference reflection prism 102 is set higher than that of a reflection surface of the bar code display of the entire circumference bar code display part 103. The entire circumference reflection prism 102 and the entire circumference bar code display part 103 are arranged on a vertical line.

The entire circumference reflection prism 102 reflects laser scanning light at high intensity due to the high reflectance, and the reflected light may saturate the light-receiving element of the laser scanner part 300 depending on conditions. It is also possible to set the conditions so that the saturation will occur as desired. Once the light-receiving element is saturated, the saturated condition continues for some time, resulting in failure in subsequent detection of the scanning light that is reflected back. If this phenomenon occurs at the time the scanning light hits the entire circumference bar code display part 103, the bar code information is difficult to detect. To avoid this problem, it is configured that the scanning light first hits the entire circumference bar code display part 103 and then hits the entire circumference reflection prism 102.

After the point cloud data is obtained by the laser scanning, a process for detecting the entire circumference bar code display part 103 is performed on the basis of the point cloud data or the laser scanning data (step S104). Details of this process are shown in FIG. 7.

The process shown in FIG. 7 is performed in parallel with obtaining the point cloud data. Of course, the process shown in FIG. 7 may be performed after all or most of the point cloud data are obtained.

In the process shown in FIG. 7, first, it is determined whether at least a part of the bar code display of the entire circumference bar code display part 103 is detected (step S201). This step of the process is performed by the code-display detection determining unit 503.

In more detail, (1) whether reflected light that is reflected back from the reflection surface constituting the bar code display of the entire circumference bar code display part 103 is detected is determined by using a threshold, and furthermore, (2) whether the reflected light exists at two or more points in the vertical direction is determined. If the two determinations are YES, the determination in step S201 is YES.

If step S201 is YES, it is determined whether reflected light that is reflected back from the reflection prism 102 is obtained on the same vertical line as the reflected light that is reflected back from the reflection surface, which is used in the determination (1) (step S202). This step of the process is performed by the prism-induced reflected light determining unit 504.

If the reflected light that is reflected back from the reflection prism 102 is obtained, the process advances to step S203. In step S203, it is determined whether the code information or the bar code information of the entire circumference bar code display part 103, which is obtained in step S201, is insufficient, that is, whether the bar code information of the entire circumference bar code display part 103 is appropriately decoded. This step of the process is performed by the decoding unit 505.

As a result of the determination in step S203, if the code information is sufficient, and the entire circumference bar code display part 103 is identifiable, the process advances to step S208. In step S208, the corresponding bar code information is obtained. This step of the process is performed by the decoded data obtaining unit 506.

As a result of the determination in step S203, if the code information is insufficient, and the identification information specific to the entire circumference bar code display part 103 is unable to be identified, the process advances to step S204. In step S204, point cloud data based on the reflected light that is reflected back from the entire circumference bar code display part 103 is obtained. This entire circumference bar code display part 103 is subjected to the determination in step S201 or S203. That is, point cloud data of the entire circumference bar code display part 103 is obtained in step S204.

After the point cloud data of the entire circumference bar code display part 103 is obtained, a distance "L" from the surveying device 400 to the entire circumference bar code display part 103 is calculated on the basis of the obtained point cloud data (step S205). This step of the process is performed by using a principle that the point cloud data is based on data of distance to scanned points. This step of the process is performed by the distance calculator 507.

Next, a scan interval "D" between the laser scanned points at a part of the entire circumference bar code display part 103 is calculated on the basis of the distance "L" obtained in step S205 (step S206). The scan interval "D" is an interval between adjacent scanned points in the scanning direction or the vertical direction of the target entire circumference bar code display part 103. The process in step S206 is performed by the scan interval calculator 508.

Next, the laser scanning is performed again in the condition in which the laser scanning condition is changed so that D<d will be obtained (step S207). This other laser scanning is performed to the vertical line in which the entire circumference bar code display part 103 extends.

The laser scanning condition is changed as described above by increasing a pulse frequency of the scanning light or decreasing the rotation speed of the rotating part 305, or both.

After the other laser scanning is performed in step S207, point cloud data that is obtained by this laser scanning is acquired. Then, the bar code display of the entire circumference bar code display part 103 is read from the degree of intensity of the reflected light that is reflected back from each of the points (step S208).

The process in step S104 in FIG. 6 is performed by these steps described above. Returning to FIG. 6, after the step S104, the process advances to step S105. In step S105, the direction of the entire circumference reflection prism 102 that is detected in step S202, as viewed from the surveying device 400, is obtained.

If there is any undetected target device 100 among the preliminarily registered target devices 100, the determination in step S106 is YES, and the process in step S104 and in subsequent steps is repeated. Thus, the identification information and the direction of the multiple target devices 100 as viewed from the surveying device 400 are obtained.

Although not illustrated using a flowchart, the processing for obtaining the exterior orientation parameters of the surveying device 400 is briefly described hereinafter. First, the location in the absolute coordinate system of each of the target devices 100 is obtained by relative positioning using the GNSS unit 104.

Then, on the basis of the identification information of each of the target devices 100 obtained in the process shown in FIG. 6 and the information of direction as viewed from the surveying device 400, the entire circumference reflection prism 102 is positioned precisely by using the function of the TS of the surveying device 400. At this time, the direction of the target device 100 as viewed from the surveying device 400 is known, and therefore, the positioning of the target device 100 using the TS function is automatically smoothly performed. It is also possible to use, instead of the TS function, the positioning data of the entire circumference reflection prism 102 based on the laser scanning information, which is obtained in step S202.

Thereafter, the exterior orientation parameters of the surveying device 400 is calculated by a method of resection on the basis of a directional line that connects each of the target devices 100 and the surveying device 400, as well as the location of each of the target devices 100 in the absolute coordinate system.

Advantages

The searching for and identifying a target using the laser scanning are automatically performed, thereby eliminating the need for an operator to perform the sighting. This simplifies the work for sighting and identifying the target.

2. Second Embodiment

The light-receiving element of the laser scanner is saturated by the highly intensive reflected light that is reflected back from the entire circumference reflection prism 102. This phenomenon can be used in reading the code information of the entire circumference bar code display part 103 by means of the laser scanning that is performed again. An embodiment of this case is described hereinafter.

Figure 8:
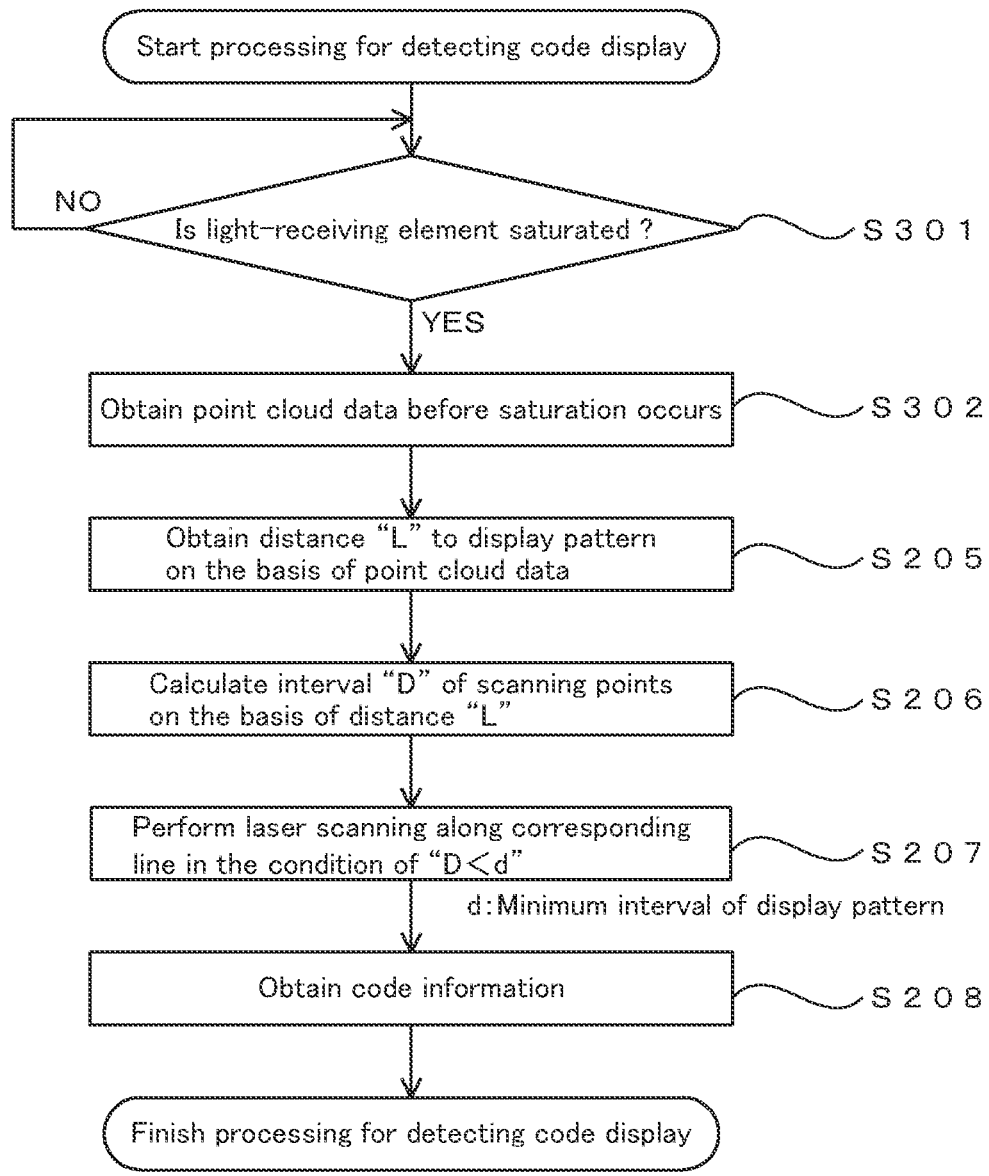
FIG. 8 is a flowchart showing an example of a processing procedure.

FIG. 8 shows an example of a processing procedure. The scanning method and the process in step S205 and in subsequent steps are the same as in the case shown in FIG. 7. The pieces of hardware are the same as those used in First Embodiment.

In this case, it is determined whether the light-receiving element of the light receiving part of the laser scanner part 300 is saturated in response to reception of the laser scanning light that is reflected back (step S301). When the light-receiving element is saturated, output of the light-receiving element is distorted, and output characteristics representing the saturation of the element are shown.

For example, it is assumed that a photodiode is used as the light-receiving element. In this case, when the photodiode is saturated, output includes an abnormal value, and the influence of the saturation remains for some time. Due to this, subsequent detection of some points or subsequent detection of the laser scanning light fails, and point clouds are missing. After a specific time has passed, the performance of the photodiode recovers. When this phenomenon occurs, the light-receiving element or the photodiode is determined as being saturated.

In the case in which the saturation of the light-receiving element is detected, the process advances to step S302. In step S302, point cloud data is obtained that is obtained immediately before the light-receiving element is saturated. The number of points in the point cloud data to be obtained is from several points to several tens of points.

The laser scanning is performed along the vertical plane from above to below. Thus, the laser scanning light first hits the entire circumference bar code display part 103 and then hits the entire circumference reflection prism 102. For this reason, in the case in which the reception of the reflected light that is reflected back from the entire circumference reflection prism 102 is detected, a point cloud that is obtained immediately before the detection can be considered as a point cloud that is obtained from the entire circumference bar code display part 103. This function is used to obtain the point cloud data of the entire circumference bar code display part 103.

The process in step S205 and in subsequent steps after the point cloud data of the entire circumference bar code display part 103 is obtained is the same as that in the case shown in FIG. 7.

In this example, it is not necessary to read the code information of the entire circumference bar code display part 103 at the first scanning to the entire circumference, and therefore, the scanning density of the first scanning to the entire circumference can be approximate accordingly.

Modification 1

Instead of performing the process in step S206, a simple process for increasing the scanning density may be performed. In this case, for example, the scanning condition may be changed so that the scanning density is double, and then, the scanning is performed again.

Modification 2

The process in FIG. 7 may be performed without steps S201 and S203. In this case, upon detection of relatively highly intense reflected light that is reflected back from the entire circumference reflection prism 102, the laser scanning for detecting the entire circumference bar code display part 103 is performed again.

Modification 3

Some degree of tilt of the target device 100 is allowable. The tilt is allowable on the condition that the laser scanning in the longitudinal direction of the entire circumference bar code display part 103 can be performed.

In this case, the target device 100 is further provided with a clinometer and an azimuth meter, and positioning data of the target device 100 obtained by the surveying device 400 is corrected. This technique is described below.

First, when the target device 100 tilts, a horizontal position, such as longitude and latitude, of the entire circumference reflection prism 102 differs from a horizontal position of the bottom end 101a of the support member 101. This difference generates measurement error in the positioning data of the target device 100. The difference between the horizontal positions or the measurement error in the horizontal position can be calculated in the condition that the direction and the degree of the tilt of the target device 100 are known.

In view of this, data of the clinometer and the azimuth meter of the target device 100 are used to quantitatively calculate the tilt of the target device 100, and the result is used to correct the positioning data of the target device 100.

Modification 4

The positioning of the target device 100, which is performed at the first stage, may be performed by another total station (TS) that is separated from the surveying device 400 and that the exterior orientation parameters are known.

What is claimed is:

1. A surveying method using a surveying device for detecting and identifying a target device having an entire circumference reflection prism and a code display, the code display being made up of multiple stripe patterns that are arranged in a vertical direction, the surveying device having a laser scanner configured to perform laser scanning along a vertical plane while rotating horizontally, the surveying method comprising:
    performing laser scanning by emitting laser scanning light along the vertical plane while making the surveying device rotate horizontally;
    detecting the code display on a basis of the laser scanning light that is reflected back; and
    in a case in which a light-receiving element is saturated due to receiving the laser scanning light that is reflected back, acquiring point cloud data that is obtained before the saturation occurs, as point cloud data of the code display.

2. The surveying method according to claim 1, wherein the entire circumference reflection prism and the code display are arranged on a same vertical line.

3. The surveying method according to claim 2, further comprising:
    detecting the entire circumference reflection prism or the code display, or both, on a basis of intensity of the laser scanning light that is reflected back; and
    performing, after the detection of the entire circumference reflection prism or the code display, or both, is performed, laser scanning again with respect to the code display in a condition in which a scanning density is changed to be higher than a previous scanning density.

4. The surveying method according to claim 2, wherein the laser scanning along the vertical plane is performed in a direction from the code display to the entire circumference reflection prism.

5. A surveying device comprising a laser scanner configured to perform laser scanning by emitting laser scanning light along a vertical plane while rotating horizontally, the surveying device configured to detect and identify a target device having an entire circumference reflection prism and a code display, the code display being made up of multiple stripe patterns that are arranged in a vertical direction, the surveying device further comprising a processor or circuitry configured to:
    detect the code display on a basis of the laser scanning light that is reflected back; and
    in a case in which a light-receiving element is saturated due to receiving the laser scanning light that is reflected back, acquire point cloud data that is obtained before the saturation occurs, as point cloud data of the code display.

6. A non-transitory computer recording medium storing computer executable instructions for controlling operation of a surveying device, the surveying device having a laser scanner configured to perform laser scanning along a vertical plane while horizontally rotating, the surveying device configured to detect and identify a target device having an entire circumference reflection prism and a code display, the code display being made up of multiple stripe patterns that are arranged in a vertical direction, the computer executable instructions are made to, when executed by a computer processor, cause the computer processor to:
    perform laser scanning by making the surveying device emit laser scanning light along the vertical plane while rotating horizontally;
    detect the code display on a basis of the laser scanning light that is reflected back; and
    in a case in which a light-receiving element is saturated due to receiving the laser scanning light that is reflected back, acquire point cloud data that is obtained before the saturation occurs, as point cloud data of the code display.

7. The surveying method according to claim 3, wherein the laser scanning along the vertical plane is performed in a direction from the code display to the entire circumference reflection prism.

* * * * *

UNITED STATES PATENT AND TRADEMARK OFFICE
CERTIFICATE OF CORRECTION

PATENT NO. : 11,592,291 B2
APPLICATION NO. : 16/442616
DATED : February 28, 2023
INVENTOR(S) : You Sasaki It is certified that error appears in the above-identified patent and that said Letters Patent is hereby corrected as shown below:

In the Specification

Column 9, Line 48-49:
In this case, the number of pulses per one rotation is 10000, and $\theta = 2\theta/10000$. Thus, $D = (2\theta/10000) \times 50 = 3$ cm.

Should read:
--In this case, the number of pulses per one rotation is 10000, and $\theta = 2\pi/10000$. Thus, $D = (2\pi/10000) \times 50 \approx 3$ cm.--

Signed and Sealed this
Twenty-seventh Day of June, 2023

Katherine Kelly Vidal
*Director of the United States Patent and Trademark Office*